United States Patent
Neog et al.

(10) Patent No.: US 11,563,671 B2
(45) Date of Patent: Jan. 24, 2023

(54) ROUTING ENGINE SWITCHOVER BASED ON HEALTH DETERMINED BY SUPPORT VECTOR MACHINE

(71) Applicant: Juniper Networks, Inc., Sunnyvale, CA (US)

(72) Inventors: Ankur Neog, Bangalore (IN); Sanjeev Kumar Mishra, Bangalore (IN); Santosh Kottanipral Mathews, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,891

(22) Filed: Dec. 29, 2020

(65) Prior Publication Data

US 2021/0409306 A1    Dec. 30, 2021

(30) Foreign Application Priority Data

Jun. 24, 2020   (IN) .............................. 202041026662

(51) Int. Cl.
  *H04L 45/12* (2022.01)
  *H04L 45/02* (2022.01)
  (Continued)

(52) U.S. Cl.
  CPC ........ *H04L 45/123* (2013.01); *G06F 11/3058* (2013.01); *G06K 9/6256* (2013.01);
  (Continued)

(58) Field of Classification Search
  CPC .... G06K 9/6256; G06K 9/6269; G06N 20/00; G06N 20/10; G06N 5/045;
  (Continued)

(56) References Cited

U.S. PATENT DOCUMENTS 7,286,468 B2 * 10/2007 Scudder .................. H04L 45/02
                                                          370/219
7,359,377 B1 *  4/2008 Kompella ............... H04L 45/50
                                                          370/254
(Continued)

OTHER PUBLICATIONS

Kim-Khoa Nguyen et al. "Routing Engine Architecture for Next Generation Routers: Evolutional Trends", International Journal of Network Protocols and Algorithms, ISSN 1943-3581, 2009, vol. 1, No. 1, 24 pages. (Year: 2009).*

(Continued)

*Primary Examiner* — George C Neurauter, Jr.
(74) *Attorney, Agent, or Firm* — Shumaker & Sieffert, P.A.

(57) ABSTRACT

This disclosure describes techniques that include determining the health of one or more routing engines included within a router. In one example, this disclosure describes a method that includes performing, by a first routing engine included within a router, routing operations, wherein the router includes a plurality of routing engines, including the first routing engine and a second routing engine; receiving, by a computing system, data including health indicators associated with the first routing engine; applying, by the computing system, a machine learning model to the data to determine, from the health indicators, a health status of the first routing engine, wherein the machine learning model has been trained to identify the health status from the health indicators; and determining, by the computing system and based on the health status of the first routing engine, whether to switch routing operations to the second routing engine from the first routing engine.

18 Claims, 9 Drawing Sheets

(51) Int. Cl.
*H04L 45/00* (2022.01)
*G06N 20/00* (2019.01)
*H04L 41/0604* (2022.01)
*G06K 9/62* (2022.01)
*H04L 45/28* (2022.01)
*G06N 20/10* (2019.01)
*G06N 5/04* (2006.01)
*G06F 11/30* (2006.01)

(52) U.S. Cl.
CPC ........... *G06K 9/6269* (2013.01); *G06N 5/045* (2013.01); *G06N 20/00* (2019.01); *G06N 20/10* (2019.01); *H04L 41/0627* (2013.01); *H04L 45/02* (2013.01); *H04L 45/22* (2013.01); *H04L 45/28* (2013.01)

(58) Field of Classification Search
CPC ... H04L 41/0627; H04L 45/02; H04L 45/123; H04L 45/22; H04L 45/28; G06F 11/3058
See application file for complete search history.

(56) References Cited

U.S. PATENT DOCUMENTS

| | | | | |
|---|---|---|---|---|
| 7,804,769 | B1* | 9/2010 | Tuplur | H04L 45/00 370/218 |
| 7,808,889 | B1* | 10/2010 | Howard | G06F 11/2028 370/217 |
| 8,799,419 | B1* | 8/2014 | Lin | G06F 9/45558 709/220 |
| 8,799,422 | B1* | 8/2014 | Qu | H04L 49/70 709/220 |
| 8,806,266 | B1* | 8/2014 | Qu | G06F 11/1484 714/4.11 |
| 8,953,439 | B1* | 2/2015 | Lin | G06F 11/1438 370/219 |
| 9,021,459 | B1* | 4/2015 | Qu | G06F 9/45558 717/170 |
| 9,491,107 | B1* | 11/2016 | Scudder | H04L 45/16 |
| 9,571,388 | B1* | 2/2017 | Ward | G06F 11/1438 |
| 10,291,464 | B1* | 5/2019 | Ward | G06F 11/1438 |
| 10,534,361 | B2* | 1/2020 | Smiley | G06Q 10/0635 |
| 10,992,557 | B1* | 4/2021 | Matthews | H04L 43/18 |
| 11,055,450 | B2* | 7/2021 | Zyglowicz | G06Q 50/06 |
| 11,284,544 | B1* | 3/2022 | Lingle | G01S 5/02695 |
| 2003/0198221 | A1* | 10/2003 | Kim | H04L 43/50 370/389 |
| 2007/0180311 | A1* | 8/2007 | Harvey | H04L 45/58 714/13 |
| 2008/0068986 | A1* | 3/2008 | Maranhao | H04L 49/557 370/220 |
| 2011/0013508 | A1* | 1/2011 | Tuplur | H04L 45/00 370/218 |
| 2011/0267962 | A1* | 11/2011 | J S A | H04L 45/28 370/242 |
| 2013/0332399 | A1 | 12/2013 | Reddy et al. | |
| 2015/0032904 | A1* | 1/2015 | Zhang | H04L 45/54 709/238 |
| 2015/0281015 | A1* | 10/2015 | Griffith | G06F 11/3452 709/224 |
| 2015/0355651 | A1* | 12/2015 | Balakrishnan | G06F 9/442 700/299 |
| 2016/0028599 | A1* | 1/2016 | Vasseur | H04L 41/145 370/252 |
| 2018/0176093 | A1* | 6/2018 | Katz | H04L 45/48 |
| 2019/0020555 | A1* | 1/2019 | Tayal | H04L 67/1012 |
| 2019/0081969 | A1* | 3/2019 | Phadke | G06K 9/6267 |
| 2019/0294233 | A1* | 9/2019 | Srinivasan | G06F 1/3296 |
| 2021/0058424 | A1* | 2/2021 | Chang | G06N 3/088 |

OTHER PUBLICATIONS

Junfeng Xie et al. "A Survey of Machine Learning Techniques Applied to Software Defined Networking (SDN): Research Issues and Challenges", IEEE Communications Surveys & Tutorials, vol. 21, No. 1, First Quarter 2019, 38 pages. (Year: 2019).*
Cisco Systems, Inc. "Cisco Nonstop Forwarding with Stateful Switchover Deployment Guide", 2006, 29 pages. (Year: 2006).*
Hiroshi Kawase et al. "Dynamic Router Performance Control Utilizing Support Vector Machines for Energy Consumption Reduction", IEEE Transactions on Network and Service Management, vol. 13, No. 4, Dec. 2016, 11 pages. (Year: 2016).*
Said van de Klundert. "Juniper MX routing engine redundancy", publicly posted May 27, 2015, 12 pages. (Year: 2015).*
Prerna Batta. "Evaluation of Support Vector Machine Kernels for Detecting Network Anomalies", 2019, 65 pages. (Year: 2019).*
Oriol Mula-Valls. "A practical retraining mechanism for network traffic classification in operational environments", 2011, 47 pages. (Year: 2011).*
Extended Search Report from counterpart European Application No. 21163795.4, dated Sep. 23, 2021, 9 pp.
Response to Extended Search Report dated Sep. 23, 2021, from counterpart European Application No. 21163795.4 filed Jun. 24, 2022, 21 pp.

* cited by examiner

ROUTING ENGINE SWITCHOVER BASED ON HEALTH DETERMINED BY SUPPORT VECTOR MACHINE

This application claims the benefit of IN Provisional Application No. 202041026662 filed Jun. 24, 2020, the entire content of which is herein incorporated by reference.

TECHNICAL FIELD

The disclosure relates to computing environments and, more particularly, to network routing devices.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available.

In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and one or more secondary routing control units. In the event the primary routing control unit fails, one of the secondary routing control units assumes routing responsibilities. In some situations, the failed router may support "non-stop forwarding," which refers to the ability to continue forwarding packets while the routing session is reestablished. Redundant components in the failed router maintain forwarding state information during control module failure, enabling the failed router to continue forwarding packets over routes that were available in the network's last-known state. As a result, impact on current packet flows through the network may be reduced.

SUMMARY

This disclosure describes techniques that include determining the health of one or more routing engines included within a router. In some examples, a machine learning-based control system of a router is trained to predict the health of a routing engine or a routing engine control board based on features that are indicative of the health of the routing engine. A high availability router having multiple redundant routing engine control boards may, based on such health status predictions, determine whether the current master or primary routing engine for the router is in poor health. If the current primary routing engine has been assessed to be in poor health, the router may identify a new routing engine that is in good health and perform a routing engine switchover operation. Predictions made by the trained machine learning model can be evaluated by an administrator and used as additional training data for retraining the machine learning model.

The techniques described herein may provide certain technical advantages. For instance, less manual intervention may be required of an administrator, since health status assessments are performed by a machine learning algorithm, rather than by an administrator considering the status of selected parameters and indicators of a routing engine. Also, health status assessments may tend to be more accurate, since data used by an administrator is often inferred based on threshold checks for each routing engine. Such thresholds might not be always reliable, and as a result, assessments made by an administrator based on such thresholds can lead to false positive and negatives, or incorrect health reporting. A machine learning-based control system of a router, as described herein, may generate a health prediction based on a more comprehensive view of a routing engine control board that does not rely merely on threshold checks.

Further, the complexity of a rule-based system can be avoided. A rule-based system for assessing routing engine health tends to be difficult to maintain and manage. For example, adding new rules to a rule-based system can be risky, because a change to one rule might break another rule and/or have unintended consequences when health predictions are performed. Accordingly, maintaining a rule-based system tends to require significant resources to maintain and debug as new rules are added or existing rules are changed or eliminated. Techniques described herein avoid such complexity.

In some examples, this disclosure describes operations performed by a network router or other network device in accordance with one or more aspects of this disclosure. In one specific example, this disclosure describes a method comprising performing, by a first routing engine included within a router, routing operations, wherein the router includes a plurality of routing engines, including the first routing engine and a second routing engine; receiving, by a computing system, data including health indicators associated with the first routing engine; applying, by the computing system, a machine learning model to the data to determine, from the health indicators, a health status of the first routing engine, wherein the machine learning model has been trained to identify the health status from the health indicators; and determining, by the computing system and based on the health status of the first routing engine, whether to switch routing operations to the second routing engine from the first routing engine.

In another example, this disclosure describes a system comprising a first routing engine configured to perform routing operations as a primary routing engine; a second routing engine configured to perform routing operations as a backup routing engine; and processing circuitry configured to: receive data including health indicators associated with the first routing engine, apply a machine learning model to the data to determine, from the health indicators, a health status of the first routing engine, wherein the machine learning model has been trained to identify the health status from the health indicators, and determine, based on the health status of the first routing engine, whether to switch routing operations to the second routing engine from the first routing engine.

In another example, this disclosure describes a computer-readable storage medium comprising instructions that, when executed, configure processing circuitry of a computing system to perform, by a first routing engine, routing operations, wherein the router includes a plurality of routing engines, including the first routing engine and a second routing engine; receive data including health indicators associated with the first routing engine; apply a machine learning model to the data to determine, from the health indicators, a health status of the first routing engine, wherein the machine learning model has been trained to identify the health status from the health indicators; and determine, based on the health status of the first routing engine, whether to switch routing operations to the second routing engine from the first routing engine.

DETAILED DESCRIPTION

In high capacity routing systems, redundancy is a key feature. Some routers implement such redundancy through multiple routing engines, which may also be referred to herein as routing engine control boards or routing control units. In such a system, one routing engine control board may be considered the primary routing engine control board, and one or more additional routing engine control boards may be designated as secondary. However, making decisions about whether to perform a switchover from the primary routing engine to a secondary routing engine may require a careful health evaluation of both the primary routing engine and one or more secondary routing engines. Moreover, rather than waiting for a complete failure of the primary routing engine, it may be appropriate to perform such a switchover from the primary routing engine before failure. Routing engine switchover decisions, or mastership decisions, are usually made based on data available from hardware and software systems in the routing engine or node.

Figure 1:
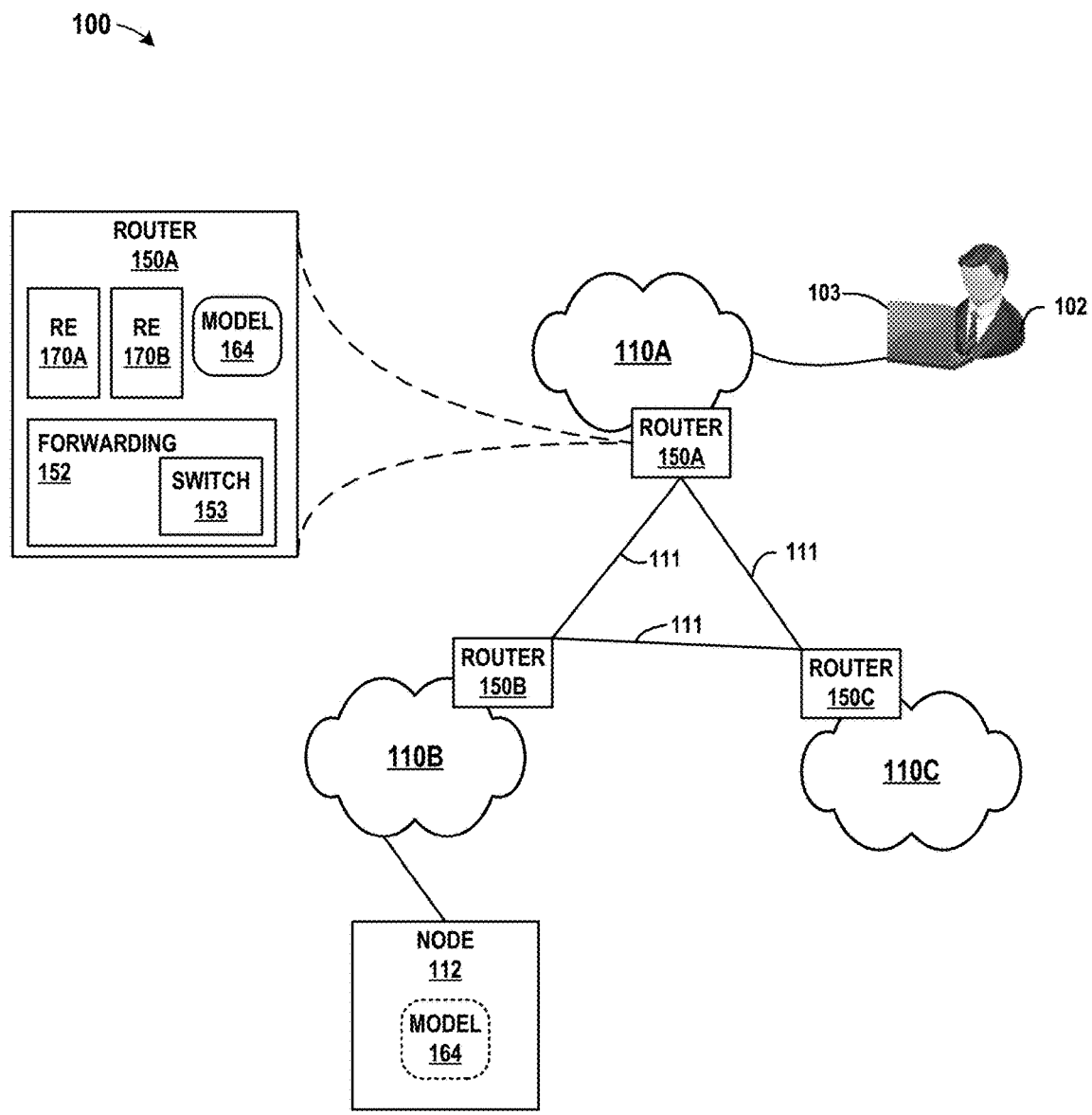
FIG. 1 is a block diagram that illustrates an example system in which the health of aspects of routers included within networks can be assessed, in accordance with one or more aspects of the present disclosure.

FIG. 1 is a block diagram that illustrates an example system in which the health of aspects of routers included within networks can be assessed, in accordance with one or more aspects of the present disclosure. In the example of FIG. 1, system 100 is formed by network 110A, network 110B, and network 110C ("networks 110"), which each are interconnected by connections 111. In general, each of networks 110 represents a variety of networked resources capable of packet-based communication. For example, networks 110 may include servers, workstations, compute nodes (e.g., including compute node 112), network printers, gateways, routers, or other network-enabled devices.

In the example illustrated, networks 110 include router 150A, router 150B, and router 150C ("routers 150") for sharing routing information and forwarding packets via connections 111. Routers 150 may maintain routing sessions for exchanging routing information representative of the topology of a network represented by system 100 via one or more routing protocols. For example, routers 150 may maintain routing sessions for the Border Gateway Protocol (BGP), the Label Distribution Protocol (LDP), the Intermediate System to Intermediate System (ISIS) protocol, the Open Shortest Path First (OSPF) protocol, the Routing Information Protocol (RIP) or other routing protocols. Administrator 102 may operate computing device 103 connected to networks 110 (e.g., network 110A, as shown), and may use computing device 103 to configure aspects of one or more of networks 110. In particular, administrator 102 may use computing device 103 to configure one or more of routers 150.

As described herein, each of routers 150 may provide for failover by including, for example, a primary control unit and at least one standby control unit. For instance, as illustrated in FIG. 1, router 150A may include routing engine 170A and routing engine 170B ("routing engines 170"), which each may represent a routing engine node, or simply a "node." In some examples, each of routing engines 170 may be implemented by a routing engine control board. In each case, the routing engine control board may serve as a redundant and/or independent hardware module having its own power supply, processing hardware, and processing logic. Also included within router 150A is forwarding component 152, which may include switch module 153.

In some examples, one of routing engines '70 may be designated as a primary routing engine 170 or active routing engine 170. In such an example, routing engine 170A may be designated the primary routing engine 170, and all other routing engines 170 (e.g., routing engine 170B and others) may be considered secondary routing engines 170. In the event that routing engine 170A fails or is determined to be in poor health, one or more of the secondary routing engines 170 (e.g., routing engine 170B), may assume the role of performing routing operations for router 150A. In such an example, routing engine 170B may maintain information (e.g., prior to failure of routing engine 170A) to enable seamless switch over from routing engine 170A to routing engine 170B. To maintain such information routing engine 170B may monitor inbound and outbound routing communications between routing engine 170A of router 150A and routers 150B and 150C. Typically, each of routers 150 within system 100 may be implemented and/or operate in a manner similar to router 150A. In other examples, one or more of routers 150 may operate differently than router 150A.

Router 150A also includes model 164, which may represent a machine learning model that has been trained to enable router 150A to accurately determine when to activate switch module 153 and trigger a switchover from one routing engine 170 to another routing engine 170. As described herein, model 164 may be trained using data collected from a routing engine, where such data includes data that is indicative of the health of a routing engine control board. Such data may include data pertaining to the power status for a routing engine control board, routing engine state, error status, temperature of the routing engine control board, and voltage levels applied or reported by a given routing engine control board. Router 150A may collect data for each of routing engines 170 within router 150A, and assess, based on applying model 164 to the collected data, the health of each of routing engines 270. Router 150A determines, based on a prediction generated by model 164, whether the currently active routing engine 170 (e.g., routing engine 170A) has a healthy status. If active routing engine 170A does not have a healthy status, switch module 153 of router 150A causes a switchover from routing engine 170A to another one of routing engines 170 that has been determined to have a healthy status (e.g., routing engine 170B).

In some examples described herein, model 164 may represent a Support Vector Machines (SVM) model. SVM models can be very effective supervised classification algorithms and tend to do well for smaller data sets. In some examples, indicators or features evaluated by model 164 may include sensed data and/or health indicators reported by each of routing engines 170. Such health indicators may include features or indicators that can be described as: PRESENCE (detection of presence of a board in the chassis), POWER_SUPPLY (indicates the status of voltages of power supply for various components in the Routing Control Board/node), BIOS_Reset_Reason (latched value of the reason for BIOS reset; e.g., reset by CPU errors, by the user, through FPGA reset), Power_Control (status of the overall power state of a node; e.g., whether it's enabled/disabled), Error_Status_Registers/I2CS_Error_Status/DDR_Error (status of health of CPU subsystem; e.g., CPU CATERR, PCH NMI, CPU MSMI Errors, or DDR errors), Interrupt_Status_Registers (fatal interrupts generated by volt sensors, SSD, USB), Temperature_Out of Range/CPU_Temperature/Board Temperature (temperature of various components reported by the various temperature sensors on the board), PCI_Endpoint_Missing (status of the PCI endpoints), Ethernet Stats (statistics of Ethernet controllers and switches in the routing control board; e.g., errors/minute, discards/minute etc.), SSD write threshold (SSD write and reads are monitored against the thresholds recommended by vendors), Memory Usage rate (e.g., mean memory occupancy of a node), CPU Usage rate (e.g., mean CPU usage of a node) In the example described in FIG. 1, features can be added (or removed), by retraining model 164 using data that incorporates the new or changed features.

In accordance with one or more aspects of the present disclosure, router 150A may evaluate the health of none or more of routing engines 170. For instance, in an example that can be described with reference to FIG. 1, sensors included within routing engine 170A collect data indicative of the health of routing engine 170A. Such data may include one or more of the features referenced above. Router 150A applies model 164 to the data to determine the classification of the health status of routing engine 170A. In some examples, the health status may have two values: good or bad. In the example being described, routing engine 170A transforms the data into a CSV (comma separated values) format and converts the data into a matrix. Routing engine 170A feeds the data to model 164. If model 164 is a polynomial kernel with degree 3, the following sample code is illustrative of how model 164 may be applied to input data having four features:

```
svm_clf_poly = Pipeline([
    ("ploy_features",PolynomialFeatures(degree=3)),
        ("scaler",StandardScaler( )),
    ("linear_svm",LinearSVC(C=1,loss="hinge"))
    ])
def
    health_good_or_bad(presence,temperature,errorst
    atus,interruptstatus):
    if(svm_clf_poly.predict([[presence,temperature,
    errorstatus,interruptstatus]]))==0:
        print("Node health is good!")
    else:
        print("Node health is bad!")
health_good_or_bad(0,45,20,30)
Output :
SVM : X, Features
    [[1 50 3 7]
    [1 55 12 6]
```

-continued

```
    [1 60 18 6]
    [1 70 17 7]
    [1 75 12 5]
    [1 80 3 10]
    [1 60 7 8]
    [1 55 10 11]
    [0 50 17 19]
    [0 45 17 10]
    [1 55 26 20]
    [1 70 16 19]
    [1 45 20 15]
    [1 55 17 9]
    [0 55 23 14]
    [1 45 25 8]
    [1 70 21 12]
    [1 65 31 11]
    [1 80 24 5]
    [0 80 23 19]]
SVM : y, Classification
[0 0 0 0 0 1 0 0 1 1 0 0 0 0 0 0 0 0 1 1]
######################################################
Node health is bad!
In the example being described, and as indicated
    above, routing engine 170A is predicted to have
    a "bad" health status.
```

In some examples, router 150A may automatically switch to another routing engine 170 when the primary routing engine 170 is predicted to have a "bad" health status. For instance, continuing with the example being described, model 164 predicts, based on information collected within routing engine 170A, that routing engine 170A has a bad health status. Router 150A outputs information about this predicted status to switch module 153. Switch module 153 automatically performs a switchover to another one of routing engines 170 (e.g., routing engine 170B). Router 150A continues to perform routing operations within system 100 using routing engine 170B. Routing engine 170A may be disabled within router 150A.

In other examples, rather than performing an automatic switchover, router 150A may alert an administrator that one or more of routing engines 170 are predicted to have a "bad" health status. For instance, model 164 may predict that routing engine 170A has a bad health status. Router 150A may generate an alert and communicate the alert to computing device 103 operated by administrator 102. The alert may provide information indicating that the health of one or more of routing engines 170 is degrading, enabling an informed switchover to another routing engine 170 that is predicted to have a "good" health status.

In some examples, model 164 may be executed within router 150A or even within routing engine 170A, particularly when model 164 is implemented as an SVM, since such models tend to have a relatively low footprint. Once model 164 is trained as an SVM, model 164 will also tend to quickly perform predictions. For SVM models, the scaling with number of samples N is approximately $O(N^3)$ which might not be highly efficient, but in at least some of the use cases being described, the rate of sample increase will be modest and model 164 could operate with a smaller sample set. Typically, an SVM model doesn't need large number of samples.

Further, in some examples, model 164 may be trained within router 150. If training model 164 does not require overly significant resources, which may be the case if model 164 is implemented as an SVM model, each of routing engines 170 may independently train and execute model 164 within router 150A. Such an implementation has authentication and security benefits, because if training and/or execution of model 164 can be performed within router 150A and/or within each of routing engines 170, router 150A can avoid communicating information about the health of router 150A (e.g. power and error status) outside of router 150A. In other examples, however, model 164 may be trained and/or executed by other computing devices and/or in other locations, such as in a remote data center. For instance, as illustrated in FIG. 1, model 164 may, in some examples, be trained and/or executed by compute node 112 attached to network 110n.

The techniques described herein may provide certain technical advantages. For instance, in examples where model 164 generates a predicted health status of one or more of routing engines 170 based on parameters, indicators, or other data indicative of the health of one or more routing engines 170, less manual intervention is required of an administrator. Without applying model 164 in the manner described herein, an administrator may need to periodically check the status of various parameters to ensure that the health of each of routing engines 170 is considered good. The data used to perform such an assessment is often inferred based on threshold checks for each of routing engines 170. These thresholds might not be always reliable, and as a result, can lead to false positive and negatives, or incorrect health reporting. Moreover, a wholistic view of each of routers 150, taking into account each of routing engines 170 within a given router 150, and the interdependence between routing engines 170 within a given router 150 is difficult and complex for an administrator to perform accurately. Accordingly, predictions and/or assessments made by administrators tend to be less than optimal.

As described herein, aspects of the debugging process as applied to routing engines 170 can be automated using historical data, enabling a more proactive scheme, rather than a reactive scheme. In general, model 164 may generate a predictive inference based on the current state of a given routing engine 170. Such an inference can be drawn based on historical data that includes a variety of parameters or features, and thus may be more accurate and/or reliable. In some examples, automated snapshots may be fed to model 164, and model 164 may be retrained if any inaccurate predictions are noticed by an administrator or other processes.

Further, through techniques described herein, the complexity of a rule-based system can be avoided. For example, rule-based systems tend to be deterministic in nature. Not having the right rule in place can result in erroneous outcomes, including false positives and false negatives. Thus, even though a rule-based system can handle simple scenarios, a rule-based system tends to be difficult to maintain and manage. For example, adding new rules can be risky, because a change to one rule might break another rule and/or have unintended consequences when health predictions are performed. Accordingly, maintaining a rule-based system tends to require significant resources to maintain and debug as new rules are added or existing rules are changed or eliminated. By training model 164 with appropriate data and using the right parameters for model 164, such complexity is reduced, and will tend to result in a more reliable and maintainable scheme for predicting the health of routing engines 170 within routers 150.

Figure 2:
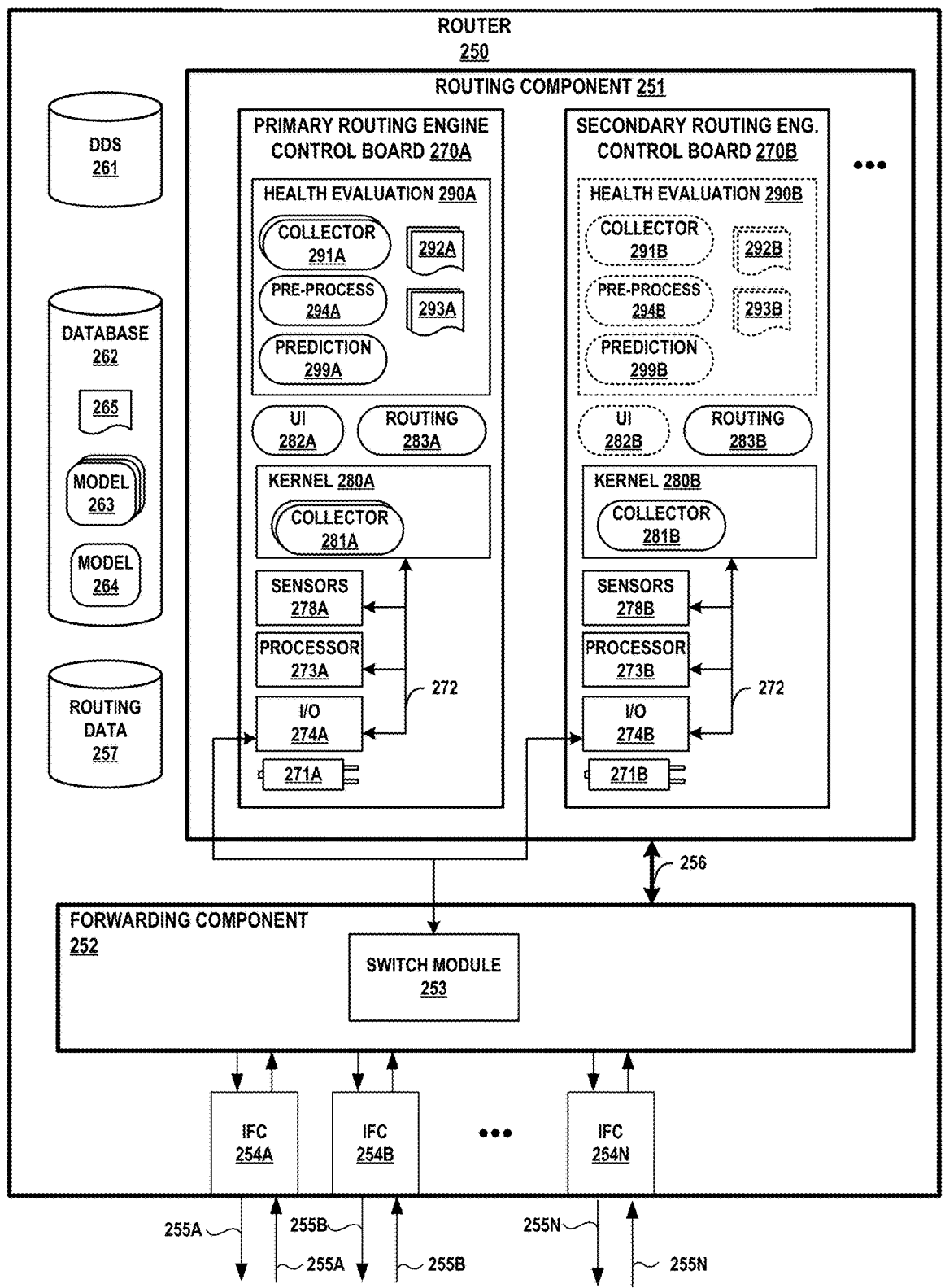
FIG. 2 is a block diagram illustrating an example router in which a machine learning model is applied to data collected from one or more routing engines to determine the health of such routing engines, in accordance with one or more aspects of the present disclosure.

FIG. 2 is a block diagram illustrating an example router 250 in which a machine learning model is applied to data collected from one or more routing engines to determine the health of such routing engines, in accordance with one or more aspects of the present disclosure. Router 250 of FIG. 2 may be described as an example or alternative implementation of one or more of routers 150 of FIG. 1. One or more aspects of FIG. 2 may be described herein within the context of FIG. 1.

In the example of FIG. 2, router 250 includes routing component 251 coupled to forwarding component 252 via high-speed interconnect 256, which may comprise a high-speed network, switch fabric or other communications means. Routing component 251 includes a number of routing engine control boards, labeled routing engine 270A and routing engine 270B ("routing engines 270"), where routing engine 270A is designated as the primary routing engine 270.

Forwarding component 252 includes switch module 253, which may control switching between routing engines 270 of routing component 251 as described herein. Forwarding component 252 is further coupled to a set of interface cards (IFCs) interfaces 254 to 254N ("interfaces 254") for sending and receiving packets via network links 255A to 255N ("network links 255"). Forwarding component 252 may receive inbound packets over network links 255 via interfaces 254, determine destinations and associated next hops for the packets in accordance with routing data 257, and output the packets through interfaces 254 over network links 255 based on the determined next hops. In some examples, forwarding component 252 may forward packets in accordance with forwarding information generated by primary routing module 283A based on routing data 257. In general, routing module 283A maintains routing protocol sessions with one or more network peers, and updates routing data 257 based on routing advertisements received from the peers. In some examples, each of routing engines 270 may monitor and record inbound and outbound routing communications between routing component 251 and the network peers.

Although only routing engines 270A and 270B are illustrated in FIG. 2, any number of routing engine control boards, or routing engines 270, may be included within routing component 251. In such an example, routing engine 270A may be designated the primary routing engine 270, and the remaining routing engines (e.g., routing engines 270 through 270N) may be designated secondary routing engines 270. In the example of FIG. 2, each of routing engines 270 within routing component 251 may be configured similarly, and may be a fully redundant routing engine 270, even if one of routing engines 270 is designated as a "primary" routing engine control board or primary routing engine 270.

Certain aspects of routing engines 270 are described herein with respect to routing engine 270A. Other routing engines 270 (e.g., routing engines 270B through 270N) may be described similarly, and may also include the same, similar, or corresponding components, devices, modules, functionality, and/or other features. Descriptions herein with respect to routing engine 270A may therefore correspondingly apply to one or more other routing engines 270 (e.g., routing engine 270B). For instance, each of routing engines 270 may include its own health evaluation module 290, which may operate independently to determine and/or evaluate information pertaining to the health of its respective routing engine 270, as further described herein.

In some examples, and as may be noted, one or more routing engines 270 may include more or fewer capabilities, features, components, and/or functionality than other routing engines 270. For certain routing engines 270, one or more components, devices, or modules shown in FIG. 2 as being included within one or more routing engines 270 may be optional. For instance, in some examples, only one or a subset of routing engines 270 may include health evaluation module 290, and in such an example, health evaluation module 290 may perform operations to determine and/or evaluate information pertaining to the health of multiple routing engines 270. Accordingly, in FIG. 2, health evaluation module 290B is illustrated as a dotted line, to indicate that some aspects of health evaluation module 290 may be optional for some of routing engines 270.

In the example of FIG. 2, routing engine 270A may include power source 271A, one or more I/O devices 274A, one or more processors 273A, one or more sensors 278A, kernel 280A, user interface module 282A, routing module 283A, and health evaluation module 290A. Kernel 280A may include a number of software components, including collector modules 281A. Health evaluation module 290A may include collector modules 291A, preprocessing module 294A, prediction module 299A, data 292A, and processed data 293A. One or more of the devices, modules, storage areas, or other components of routing engine 270A may be interconnected to enable inter-component communications (physically, communicatively, and/or operatively). In some examples, such connectivity may be provided by through communication channels (e.g., communication channels 272A), a system bus, a network connection, an inter-process communication data structure, or any other method for communicating data.

Power source 271A may provide power to one or more components of routing engine 270A. Power source 271A may receive power from the primary alternating current (AC) power supply in a data center, building, or other location. In other examples, power source 271A may be a battery or a device that supplies direct current (DC). In still further examples, routing engine 270A and/or power source 271A may receive power from another source. One or more of the devices or components illustrated within routing engine 270A may be connected to power source 271A, and/or may receive power from power source 271A. Power source 271A may have intelligent power management or consumption capabilities, and such features may be controlled, accessed, or adjusted by one or more modules of routing engine 270A and/or by one or more processors 273A to intelligently consume, allocate, supply, or otherwise manage power.

One or more processors 273A of routing engine 270A may implement functionality and/or execute instructions associated with routing engine 270A or associated with one or more modules illustrated herein and/or described below. One or more processors 273A may be, may be part of, and/or may include processing circuitry that performs operations in accordance with one or more aspects of the present disclosure. Examples of processors 273A include microprocessors, application processors, display controllers, auxiliary processors, one or more sensor hubs, and any other hardware configured to function as a processor, a processing unit, or a processing device. routing engine 270A may use one or more processors 273A to perform operations in accordance with one or more aspects of the present disclosure using software, hardware, firmware, or a mixture of hardware, software, and firmware residing in and/or executing at routing engine 270A.

One or more I/O devices 274A may communicate with forwarding component 252 and/or switch module 253 to control or perform routing engine switchover operations. I/O devices 274A may also communicate with each of distributed data store 261, database 262, and routing data 257 to enable access, by routing engine 270A, of any type of data stored within distributed data store 261, database 262, and routing data 257. In addition, I/O devices 274A may represent any input or output devices of routing engine 270 not otherwise separately described herein.

One or more sensors 278A of 270A may include devices capable of detecting data, status information, or health indicators pertaining to the health of routing engine 270A. Such information may involve power source information, including power supply indicators, or power control. Such information may also include various status information, including information relating to BIOS resets, error states, information stored within error status registers or interrupt status registers, and Ethernet statistics. Sensors 278A may detect information about the temperature of components of routing engine 270A, such as the temperature of processors 273A or the control board associated with routing engine 270A. Sensor 278A may detect information about storage devices included within routing engine 270 (e.g., write thresholds or available capacity). Sensor 278A may also detect information pertaining to utilization rates of components within routing engine 270A (e.g., memory or CPU utilization rates).

Kernel 280A may be an operating system kernel that provides an execution environment for execution of various modules included within routing engine 270A on processors 273A. In general, processors 273A may access stored instructions and/or data and execute such instructions and/or modules of routing engine 270A. Such modules may be implemented as software, but may in some examples include any combination of hardware, firmware, and software. Further, some modules may execute within kernel space (e.g., collector modules 281A), while others may execute within user space or non-kernel space (e.g., collector modules 291A). The combination of processors 273, storage devices within routing engine 270A, and kernel 280A may retrieve, store, and/or execute the instructions and/or data of one or more applications, modules, or software.

Collector modules 281A may perform functions relating to data collection within kernel 280A, and may be a software module that receives information from sensor 278A and reports such information to preprocessing module 294A of health evaluation module 290A. In some examples, collector modules 281A may include or be part of driver software executing within kernel 280A.

User interface module 282A may perform functions relating to generating user interfaces for presentation at a computing device operated by an administrator. User interface module 282A may receive information from one or more modules within routing engine 270A and cause I/O device 274A to communicate information sufficient to generate a user interface over a network to a client device operated by an administrator.

Health evaluation module 290A may perform functions relating to collecting information about the health of routing engine 270A (e.g., collector modules 291A), processing (by preprocessing module 294A) data collected by collector modules 281 and collector modules 291, training and/or updating models 263 to make predictions about the health of one or more of routing engines 270 (prediction module 299A). In some examples, collector modules 291A may execute as a standalone application within user space that is devoted to collecting information about the health of aspects of routing engine 270A. In other examples, collector modules 291A may be part of another module executing in user space that may already be collecting information about routing engine 270A. In such an example, collector modules 291A may be used to report such information to preprocessing module 294A or to other modules within health evaluation module 290A. Health evaluation module 290A may also generate control signals to perform routing engine control board switchovers as described herein.

Each of distributed data store 261, database 262 and model 263 may represent any suitable data structure or storage medium for storing information. As described herein, distributed data store 261 may store data collected from collector modules 281A and/or collector modules 291A or information relating to such data. Database 262 may store training data 265 along with one or more models 263. Database 262 may also store production model 264, which may be a model designated as best suited for use when router 250 is in production, performing routing operations within a network. Routing data 257 stores routing data used by one or more of routing modules 283 within respective routing engines 270 route and/or forward network data.

In FIG. 2, and in accordance with one or more aspects of the present disclosure, router 250 may receive data that can be used to train a machine learning model. For instance, in an example that can be described with reference to FIG. 1 and FIG. 2, I/O device 274A detects input over high-speed interconnect 256 and outputs to preprocessing module 294A information about the input. Preprocessing module 294A determines that the input corresponds to instances of data 292A, which may include information about health indicators collected during resiliency testing of one or more routing engines 270, or devices similar to routing engines 270. In some examples, data 292A may be derived from historical records associated with routing engine control boards. Data 292A may alternatively, or in addition, be derived from problem reports that were generated by a diagnostic or system test which were interpreted as indicative of bad health. Data 292A may also include data indicative of good health for a routing engine control board. Data 292A may also include additional data including an analysis by an administrator, engineer, or developer that has assessed the state of the routing engine control board underlying the data. Each instance of data 292A may be labeled, based on such an analysis and established thresholds, to indicate the health status (e.g., bad or good) for each set of data. Such thresholds may correspond to established benchmarks for disk write, CPU occupancy or utilization over time, temperature and/or voltage threshold crossing, and the like. In the example being described, data 292A may be fed to routing engine 270A manually, by an administrator. For example, 294A of routing engine 270A may receive data 292A over network 110A (see FIG. 1) in response to input detected at computing device 103 from administrator 102.

Routing engine 270A may process data 292A. For instance, in the example being described and with reference to FIG. 2, preprocessing module 294A of routing engine 270A processes data 292A to transform data 292A into processed data 293A. Processed data 293A may be in a form that can be used as a training set suitable for training one or more models 263. In some examples, and to transform data 292A into processed data 293A, preprocessing module 294A may filter data 292A, removing unwanted or unnecessary data. Preprocessing module 294A may standardize data 292A and perform variance scaling to normalize the data to certain ranges to help the machine learning algorithms to properly weight features and set default values for non-numeric or invalid data values. For example, strings may be converted to standard constants or enums, and negative values may be transformed into positive values. Where data 292 includes data associated with a number of health indicators or features (e.g., CPU utilization values, interrupt values, error status indicators), preprocessing module 294A may combine some of the features into composite features, thereby producing processed data 293A with a smaller number of features. Reducing the number of features may help some machine learning algorithms converge or converge more quickly, and may have other beneficial effects when training machine learning models. Preprocessing module 294A may also scale features by applying weights to features to ensure that a small number of features does not overly influence the results of the machine learning process. For instance, preprocessing module 294A may penalize low priority features and confer a higher weight to higher priority features. A low priority feature may be one that is not expected to reliably indicate the health of routing engine 270A (e.g., CPU utilization), and a high priority feature is a feature that is expected to more reliably indicate the health of routing engine 270A (e.g., memory occupancy and critical interrupts).

Routing engine 270A may store processed data 293A. For instance, in the example being described, preprocessing module 294A causes I/O device 274A to output information about processed data 293A to database 262. Database 262 receives information from preprocessing module 294A and stores the information as training data 265. In some examples, training data 265 includes a number of samples, or data sets, with each labeled to indicate a health status associated with the data set. In some examples, such a label may simply indicate whether the associated data set is from a routing engine control board having two states: good health or bad health. In other examples, each data set may have a label that could represent a larger number of states, or that is a number (e.g., from 1 to 100), representing varying degrees of health. Database 262 makes training data 265 available for training machine learning algorithms.

Router 250 may train one or more machine learning models. For instance, still referring to the example being described in connection with FIG. 2, prediction module 299A of health evaluation module 290A outputs, to database 262, a request for training data 265. Database 262 responds to the request by outputting training data 265. In some examples, prediction module 299 may split training data 265 into a training set, a validation set, and a test set. Prediction module 299 uses the training set to train one or more models 263. In some examples, and as described herein, one or more of models 263 may be based on SVM algorithms. For one or more of such algorithms, prediction module 299A may apply various parameters to train models 263, and some of models 263 may differ based on varying values of the parameters applied by prediction module 299A.

Router 250 may evaluate models 263. For instance, referring again to the example being described in connection with FIG. 2, prediction module 299A accesses that portion of training data 265 corresponding to the validation set, and applies each of models 263 to the validation set. In response, each of models 263 generates a predicted health status label. Prediction module 299A compares the predicted health status labels to the labels included in the validation set. Prediction module 299A evaluates the skill of each of models 263 by determining which of models 263 most accurately predicts the label included in the validation set.

Router 250 may, in response to input, adjust the model. For instance, again with reference to the example being described, prediction module 299A may adjust one or more of models 263 in response to the results of the predicted health status labels for the validation set. In some examples, prediction module 299A may make such adjustments based on or in response to user or administrator 102 input. If adjustments are made, prediction module 299A may retrain one or more of models 263 and then verify the performance of each of models 263 using the validation set or other data.

Router 250 may designate a model to be used in production. For instance, continuing with the example benign described, prediction module 299A designates one of models 263 as production model 264. In some examples, production model 264 may correspond to the model included within models 263 that exhibited the best performance or skill in accurately predicting the health of a routing engine control board from the training set and/or the validation set.

Router 250 may confirm the accuracy of production model 264 and deploy production model 264. For instance, still continuing with the example being described, prediction module 299A applies production model 264 to the test set. Prediction module 299A confirms that production model 264 exhibits performance, for the test set, that is sufficiently close to production model 264 on the training set and the validation set. Prediction module 299A deploys production model 264 for use within routing engine 270A to evaluate the health of routing engine 270A while routing engine 270A is in production (i.e., performing routing operations on a network). In some examples, prediction module 299A may communicate with each of prediction modules 299 within other routing engines 270 (e.g., prediction module 299B within routing engine 270B) to enable production model 264 to be deployed for use in each of routing engines 270 (i.e., routing engine 270A as well as routing engines 270B through 270N). In this way, production model 264 is applied to data collected within each of routing engines 270, so that the health of each of routing engines 270 can be assessed.

Router 250 may collect data during operation of routing engine 270A. For instance, in the example being described and still with reference to FIG. 2, sensors 278A of routing engine 270A collect data associated with attributes of routing engine 270A. In some examples, sensors 278A may collect data relating to CPU and memory utilization rates, power status and quality as applied to the routing engine control board corresponding to routing engine 270A, routing engine state, error status, temperature of the routing engine control board, and voltage levels applied or reported by a given routing engine control board. Each of sensors 278A output information about the collected data to collector modules 281A and collector modules 291A of routing engine 270A.

In some examples, sensors 278A may represent devices that collect hardware-related data. In addition, software agents deployed within routing engines 270A may collect software-related data, such as information about errors reported by software or operational metrics generated by applications or processes executing on routing engine 270A. In some examples, such agents are included within collector modules 281 and collector modules 291, and may perform data collection operations within the kernel (i.e., collector modules 281) and outside the kernel (i.e., collector modules 291). Each of collector modules 281A may be implemented as software elements in kernel space to access certain aspects of routing engine 270A. Each of collector modules 291A may be implemented as software elements outside of kernel space (e.g., in user space) to access other aspects of routing engine 270A. In some cases, processes within routing engine 270A may already be collecting some relevant data, and one or more of collector modules 281A and collector modules 291A may be implemented to collect data for use in assessing the health of routing engine 270A as described herein. Where processes within routing engine 270A are not collecting relevant data that can be easily used to assess the health of routing engine 270A, one or more of collector modules 281A and collector modules 291A may operate to collect the data for use in health assessments.

Once collector modules 281A and collector modules 291A receive the collected data (e.g., both hardware and software data), each of collector modules 281A and collector modules 291A may perform initial validations of the data for correctness and consistency. In some examples, such initial validation may involve, for example, performing multiple reads for a state over a period of time to ensure consistency and to avoid transient effects, averaging of read data for analog variables such as temperature or voltage to stabilize read values, cross validation with other attributes, and applying hysteresis and thresholds wherever applicable. Each of collector modules 281A and collector modules 291A store the collected data, after initial validation, as data 292A. The data collected by collector modules 281 and collector modules 291 and stored as data 292A may be of the same type as the data previously used to create training data 265.

In some examples, collector modules 281A and collector modules 291A may operate pursuant to a publish/subscribe model, where one or more of collector modules 281A and collector modules 291A publish data 292A and notify modules or other devices that subscribe to updates to data 292A. In some examples, collector modules 281A and data items 292A report updates to data 292A to distributed data store 261 pursuant to such a publish/subscribe model. In such an example, modules within routing engine 270A (e.g., preprocessing module 294A) may subscribe to updates to data items 292A, and as additional data items 292A is stored by collector modules 281A and collector modules 291A, each subscriber is notified that new data is available within distributed data store 261. Such subscribers (e.g., preprocessing module 294A) may then access the data within distributed data store 261, and process the data accordingly. Although distributed data store 261 is illustrated in FIG. 2 as being outside each of routing engines 270, in other examples, distributed data store 261 may be included within one or more of routing engines 270 or may be distributed across routing engines 270.

Router 250 may preprocess data 292A. For instance, continuing with the example being described and with reference to FIG. 2, preprocessing module 294A accesses data 292A and performs preprocessing operations, transforming data 292A into processed data 293A. As previously described, such preprocessing may involve removing unwanted or unnecessary data, performing standardizing, variance scaling, and conversion operations, combining some features, and prioritizing features. In some examples, such as in the publish/subscribe model described above, preprocessing module 294A may access data 292A from within distributed data store 261.

Router 250 may apply production model 264 to processed data 293A to assess the health of routing engine 270A. For instance, still continuing with the example being described with reference to FIG. 2, prediction module 299A applies production model 264 to processed data 293A to generate a predicted health status for routing engine 270A. Prediction module 299A evaluates the health status predicted by production model 264 to determine whether routing engine 270A has a good or bad health. If the predicted health is good, prediction module 299A may continue to enable routing engine 270A to perform routing operations without change. If the predicted health is bad, prediction module 299A may take one or more actions.

For example, if the predicted health of routing engine 270A is bad, router 250 may initiate communications. For instance, in an example that can be described in the context of FIG. 1 and FIG. 2, prediction module 299A outputs information about the bad health assessment of routing engine 270A to user interface module 282A. User interface module 282A generates information sufficient to generate a user interface. User interface module 282A causes I/O device 274A to output a signal over a network (e.g., network 110A of FIG. 1 if router 250 of FIG. 2 corresponds to router 150A of FIG. 1). Computing device 103 of FIG. 1 (which may be operated by administrator 102) detects a signal and determines that the signal corresponds to information sufficient to present a user interface. Computing device 103 presents a user interface, informing administrator 102 that the health of routing engine 270A is bad, and prompting administrator 102 to switch routing operations to a different one of routing engines 270, such as routing engine 270B.

Router 250 may perform a routing engine switchover in response to administrator input. For instance, continuing with the example being described with reference to FIG. 1 and FIG. 2, computing device 103 detects input interacting with the user interface presented at computing device 103. Computing device 103 outputs a signal over network 110A. I/O device 274A of routing engine 270A detects a signal and outputs information about the signal to prediction module 299A. Prediction module 299A determines that signal corresponds to input from an administrator authorizing a routing engine switchover from routing engine 270A to routing engine 270B. Prediction module 299A causes I/O device 274A to output a control signal to switch module 253. Switch module 253 detects the control signal and switches routing engine operations from routing engine 270A to routing engine 270B. In this example, the switchover operation is an informed switchover, performed after confirmation by an administrator.

In another example, router 250 may automatically perform a routing engine switchover. For instance, in a different example that can be described with reference to FIG. 2, prediction module 299A evaluates information about a recent health assessment of routing engine 270A and determines that the health assessment indicates that routing engine 270A is in bad health. Prediction module 299A further determines that a recent health assessment associated with routing engine 270B indicates that routing engine 270B is in good health. Prediction module 299A outputs a control signal to switch module 253. Switch module 253 detects the control signal and switches routing engine operations from routing engine 270A to routing engine 270B. In this example, the switchover operation is performed automatically, without requiring input from an administrator.

In previous examples, router 250 has been described as primarily performing health assessments of routing engine 270A. However, router 250 may perform health assessments of each of routing engines 270, and not just routing engine 270A. For instance, in some examples, each of routing engines 270 may each have its own health evaluation module 290, capable of independently performing health assessments of respective routing engines 270. Each of health evaluation modules 290 within routing engines 270 may collect data during operation, publish the data, and transform respective data items 292 into processed data items 293, in a manner similar to that described above in connection with routing engine 270A. Each of prediction modules 299 may apply production model 264 to respective processed data items 293 to assess the health of respective routing engines 270. If any routing engines 270 that are acting as a primary or active routing engine control board are predicted to have a bad health status, router 250 may perform a routing engine switchover operation (automatically or in response to administrator input) as described above. Further, assessments of each of routing engines 270 are helpful when performing a routing engine switchover from the primary routing engine, because the new primary routing engine preferably has a "good" health assessment.

Modules illustrated in FIG. 2 (e.g., collector modules 281, collector modules 291, preprocessing modules 294, prediction modules 299, and others) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
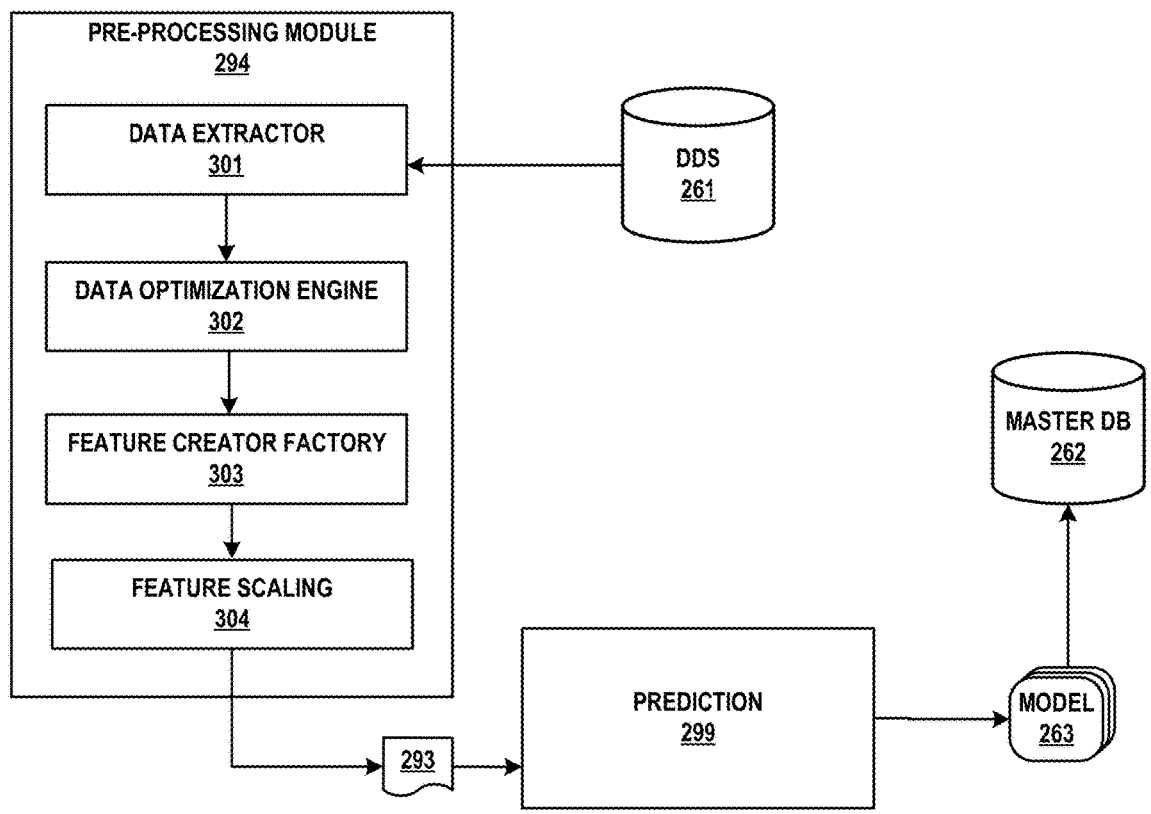
FIG. 3 is a block diagram illustrating an example architecture of an example preprocessing module, in accordance with one or more aspects of the present disclosure.

FIG. 3 is a block diagram illustrating an example architecture of a preprocessing module, in accordance with one or more aspects of the present disclosure. The example of FIG. 3 illustrates preprocessing module 294, prediction module 299, distributed data store 261, database 262, and model 263. Each of preprocessing module 294, prediction module 299, distributed data store 261, database 262, and model 263 may correspond to like-numbered elements of FIG. 2, and such modules and/or data stores may be implemented in a manner consistent with the description of the corresponding items in FIG. 2.

In FIG. 3, preprocessing module 294 is illustrated as including data extractor module 301, data optimization engine 302, feature creator factory module 303, and feature scaling module 304. In some examples, preprocessing module 294 may be front ended by a graphical user interface (e.g., user interface modules 282 of FIG. 2) that may serve to abstract out some or all of the complexities of data manipulation performed by preprocessing module 294.

Data extractor module 301 may receive data from distributed data store 261 and may also serve as an orchestrator for preprocessing module 294. Data extractor module 301 may also include aspects of or some of the functionality of collector modules 281 and/or data items 292.

Data optimization engine 302 may include a data filter that removes unwanted data that is collected by the extractor which is not used by prediction module 299. Data optimization engine 302 may also include a data standardization component that performs mean removal and variance scaling. In some examples, such a data standardization component may, based on manual inspection, normalize the data to certain ranges, convert strings to standard strings or constants, transform negative values into positive values, treat data that is not available or is within an unwanted range (e.g., "not a number" or undefined), and perform other functions.

Feature creator factory module 303 may combine various elements into cohesive features, simplifying potentially hundreds of features. For example, feature creator factory module 303 may construct an overall feature for certain routers by implementing mastership (i.e., switchover) decisions based on the attributes collected to one or more of routing engines 270.

Feature scaling module 304 may assign weights to various features so that preprocessing module 294 ensures that a feature with low priority doesn't overly influence or bring down the health of the overall system. In some examples, feature scaling module 304 may penalize low priority features and/or add more weight to higher priority features. In some examples, feature scaling module 304 may also perform normalization so that the data is optimized to be fed into the SVM classifier.

After preprocessing by preprocessing module 294, preprocessing module 294 outputs processed data 293 to prediction module 299. Prediction module 299 uses processed data 293 to train one or more models 263. Prediction module 299 stores models 263 within database 262, and may, as previously describe, designate one of models 263 as a production model.

Figure 4:
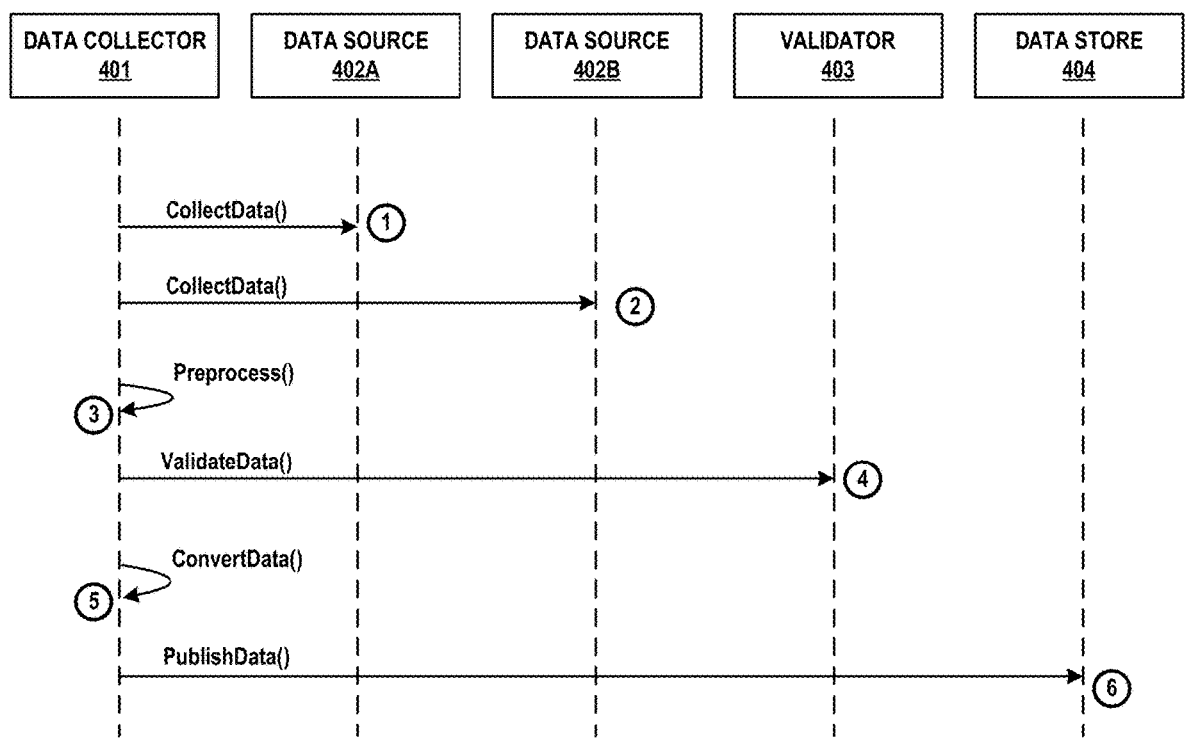
FIG. 4 is a flow diagram illustrating data collection operations performed by an example routing engine, in accordance with one or more aspects of the present disclosure.

FIG. 4 is a flow diagram illustrating data collection operations performed by an example routing engine, in accordance with one or more aspects of the present disclosure. The example of FIG. 4 illustrates data collector 401, data source 402A, data source 402B, validator 403, data store 404, and various workflow between such components. Data collector 401 may correspond to one or more of collector modules 281 or collector modules 291 illustrated in FIG. 2. Data source 402A and data source 402B ("data sources 402" representing any number of data sources) may correspond to hardware components or software agents collecting data about aspects of a routing engine control board. For instance, one or more of data sources 402 may collect information about memory or CPU utilization, or temperature information relating to a component of the routine engine control board. Validator 403 may perform validation functions as described herein as being performed by collector modules 281 and/or data items 292 in connection with FIG. 2. Data store 404 may correspond to distributed data store 261 of FIG. 2.

In general, data collection software may leverage current user space processes and kernel drivers to collect data.

Where such data is not already collected, enhancements to such processes may be performed. Data collection may be performed in FIG. 4 by software agents (similar to user interface modules 282 and data items 292) in the manner described in connection with FIG. 2.

In FIG. 4, each collection process has a data collection agent module which collects the hardware and software states of a particular data sources 402 (see "1" and "2" in FIG. 4), which may be hardware or software components. The collected data goes through an initial validation for correctness and consistency (see "3" in FIG. 4). For example, when collecting data, multiple reads for a state over a period of time may be performed to ensure consistency and to avoid transient data or glitches. Validator 403 may assess such reads to eliminate bad data, may average the readings for analog variables such as temperature or voltage, may cross validate the data with other attributes, and may apply hysteresis and thresholds wherever applicable (see "4" in FIG. 4). After the initial validation, the data may be converted as appropriate (see "5" in FIG. 4). The converted data may be stored in an appropriate data format, which may include a timestamp, unique identifier, thresholds used for computation, and other information (see "6" in FIG. 4).

Figure 5:
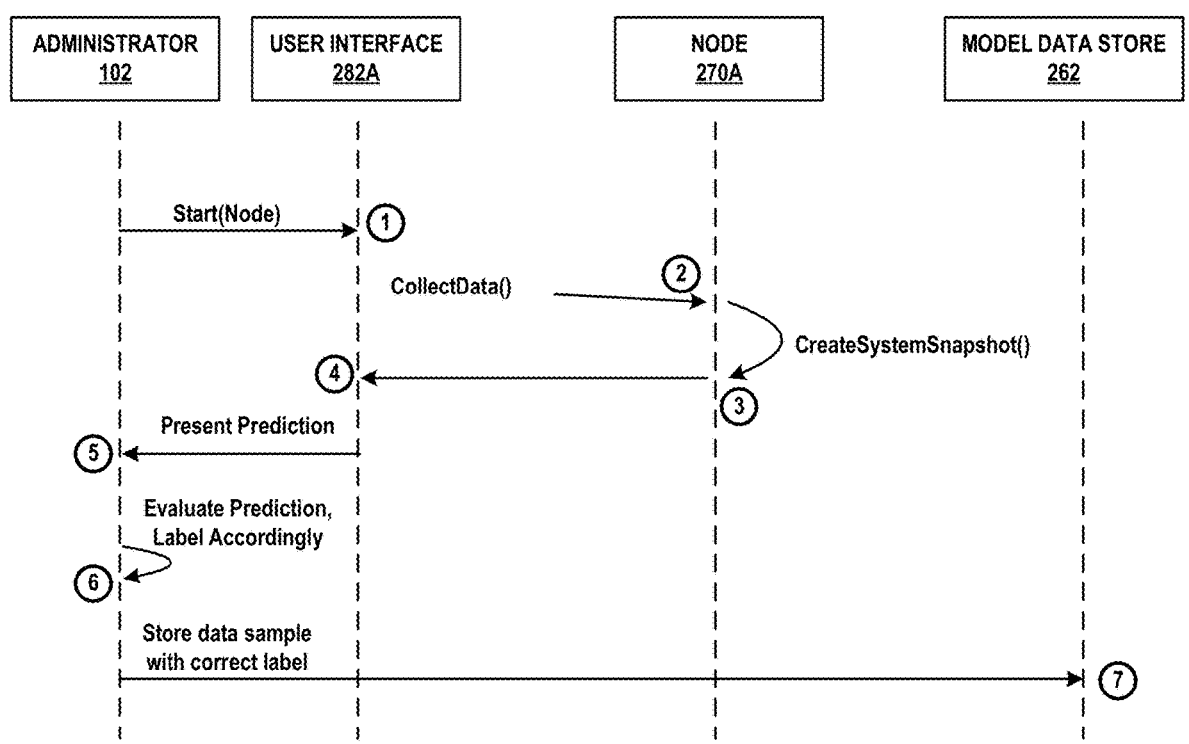
FIG. 5 is a flow diagram illustrating a health status prediction being performed on an example routing engine, in accordance with one or more aspects of the present disclosure.

FIG. 5 is a flow diagram illustrating a health status prediction being performed on an example routing engine, in accordance with one or more aspects of the present disclosure. The example of FIG. 5 illustrates administrator 102, user interface module 282A, routing engine 270A, and database 262. Each of administrator 102, user interface module 282A, routing engine 270A, and database 262 may correspond to like-numbered elements of FIG. 1 and FIG. 2.

In FIG. 5, administrator 102 may initiate an evaluation of routing engine 270A by interacting with user interface module 282A (see "1" in FIG. 5). User interface module 282A may, in response to such interaction, initiate a request to collect data from one or more nodes, such as routing engine 270A (see "2" in FIG. 5). Routing engine 270A initiates a system snapshot, collecting data relevant to the health of routing engine 270A, and collecting data corresponding to training data (e.g., training data 265) collected when training the machine learning model being used to predict the health of routing engine 270A (see "3" in FIG. 5). Routing engine 270A collects and processes the data, and generates a health status prediction by applying a previously-trained machine learning model to the data. Routing engine 270A outputs the results of the prediction to user interface module 282A (see "4" in FIG. 5). User interface module 282A presents a user interface with information about the prediction ("5" in FIG. 5). Administrator 102 evaluates the prediction and determines whether the prediction is incorrect (e.g., the prediction was faulty or relied too much on low priority data). Administrator 102 relabels the data collected in the systems snapshot (e.g., data underlying an incorrect prediction of "bad" health is relabeled as representative of "good" health) ("6" in FIG. 5). Administrator 102 causes the data sample, with the updated label, to be stored within database 262 (e.g., by interacting with user interface module 282A). In some examples, routing engine 270A may retrain the machine learning model to reflect the updated sample.

In some examples, a periodic collection of the snapshot of the features can be enabled and stored in a lightweight database (e.g., every 8 hours) in router 250 and such snapshots may then be collected (e.g., every 7 days) and stored in database 262 to expand the data samples or training data. If data is collected continually, the size of database 262 can expand very rapidly. To address this, and in some examples, preprocessing may be performed before storing to ensure that the new data sample is not a duplicate. Alternatively, or in addition, router 250 may periodically retrain production model 264 and purge old data once distributed data store 261 storage crosses certain thresholds.

In the example described, administrator 102 may modify a prediction generated by a machine learning model, effectively refining and/or improving the machine learning model, if the model is retrained with the updated sample. In addition, such datasets can be easily shared with other administrators from other organizations that may use the same type of router. For instances, administrators could share CSV or Excel format labelled datasets with other administrators for use in applying and/or retraining their own machine learning algorithms. In some situations, an organization (e.g., the router manufacturer) may supply such datasets as an option add-on feature. To do so, such an organization may employ a push mechanism, where software is included as part of a network management module in a separate package that can be shared. Such a module may include a training model, a database, mechanisms to retrain models. In another example, such an organization may employ a pull mechanism, where valid datasets are made available on a network for administrators to obtain for their own use in their own networks.

Figure 6:
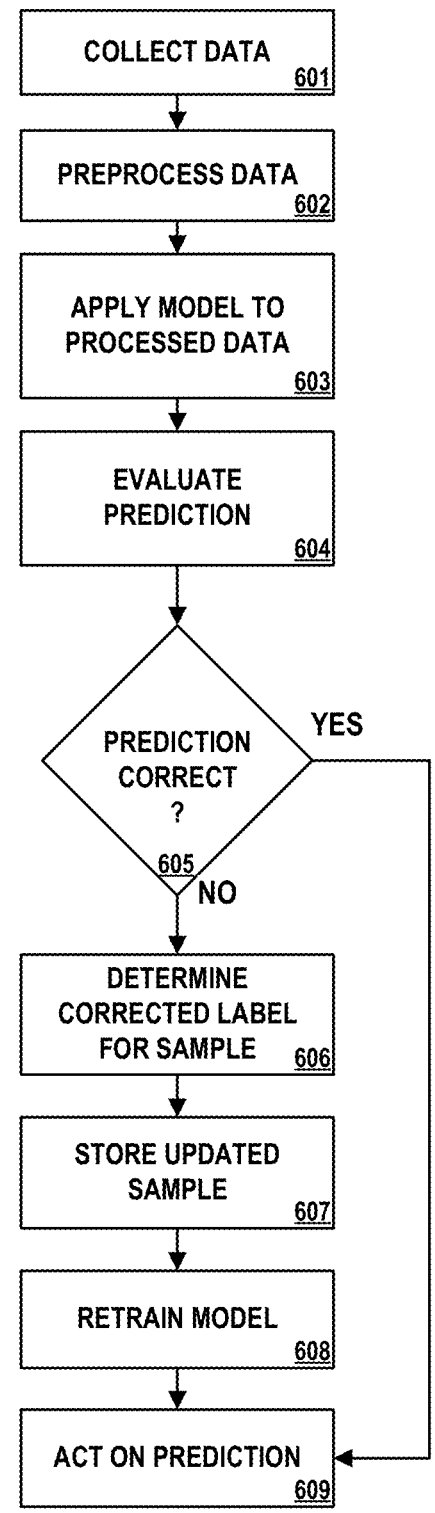
FIG. 6 is a flow chart illustrating a health status prediction performed by an example routing engine, in accordance with one or more aspects of the present disclosure.

FIG. 6 is a flow chart illustrating a health status prediction performed by an example routing engine, in accordance with one or more aspects of the present disclosure. FIG. 6 is described herein within the context of router 150A of FIG. 1. In other examples, operations described in FIG. 6 may be performed by one or more other components, modules, systems, or devices. Further, in other examples, operations described in connection with FIG. 6 may be merged, performed in a difference sequence, omitted, or may encompass additional operations not specifically illustrated or described.

In the example of FIG. 6, and in accordance with one or more aspects of the present disclosure, router 150A may collect data (601). For example, routing engine 170A of router 150A collects data relevant to the health of a routing engine control board included within or represented by routing engine 170A. Each of the other routing engines 170 within router 150A may also collect data to the health of its respective routing engine control board.

Router 150A may preprocess data (602). For example, routing engine 170A preprocesses the collected data so that the data is in a form similar to the training data used to train model 164. In general, routing engine 170A may prepare the data so that it can be fed to model 164 for predicting a health status of routing engine 170A. Each of the other routing engines 170 within router 150A may also preprocess its respective collected data.

Router 150A may apply model 164 (603). For example, routing engine 170A outputs the preprocessed data to model 164. Model 164 evaluates the data and predicts the health of routing engine 170A based on the data.

Router 150A may evaluate the prediction generated by model 164 (604). For example, routing engine 170A outputs information about the prediction over network 110A. Computing device 103 detects a signal over network 110A and determines that the signal includes information sufficient to present a user interface. Computing device 103 presents a user interface that includes information about the prediction and the underlying data, enabling administrator 102 to evaluate the prediction.

Router 150A may determine, based on input received from administrator 102, whether the prediction was correct (605). For example, computing device 103 detects interactions with the user interface presented at computing device 103 and outputs a signal over network 110A. Routing engine 170A of router 150A detects a signal and determines that the signal corresponds to an assessment of the prediction made by administrator 102. In some examples, the assessment indicates that the prediction was correct (YES path from 605). In other examples, the assessment indicates that administrator 102 believes the prediction was incorrect (NO path from 605).

If the prediction was incorrect, router 150A may determine a corrected label for the collected data (606). For example, routing engine 170A determines, based on the assessment received from computing device 103, that model 164 predicted that the health was routing engine 170A was bad, but administrator 102 has indicated that the health of routing engine 170A was actually good.

Router 150A may store the sample and the updated label (607). In such an example, routing engine 170A generates an updated label for the sample and includes the new label with the sample. Routing engine 170A updates the training data for model 164 (e.g. see training data 265 of FIG. 2).

Router 150A may retrain model 164 (608). For example, routing engine 170A accesses the newly-updated training data. Routing engine 170A retrains model 164 using the newly-updated training data. Routing engine 170A generates a new or updated model 164.

Router 150A may act on the prediction (609). In some examples, if model 164 correctly predicted that the health of routing engine 170A was good, routing engine 170A might not take any action. If model 164 correctly predicted that the health of routing engine 170A is bad (or incorrectly predicted that the health of routing engine 170A is good), router 150A may cause switch module 153 to perform a switchover operation to another one of routing engines 170 (e.g., routing engine 170B).

Figure 7A:
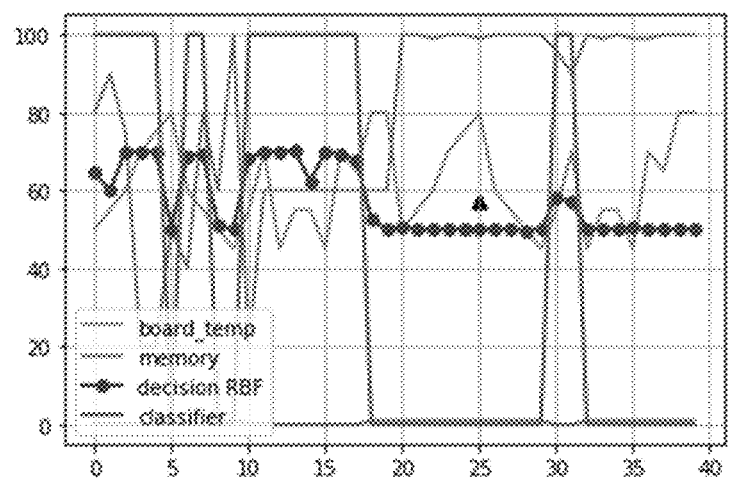
FIG. 7A, FIG. 7B, and FIG. 7C are prediction graphs illustrating different parameters applied to a Support Vector Machines (SVM) algorithm using a radial basis function (RBF) kernel, in accordance with one or more aspects of the present disclosure.
Figure 7B:
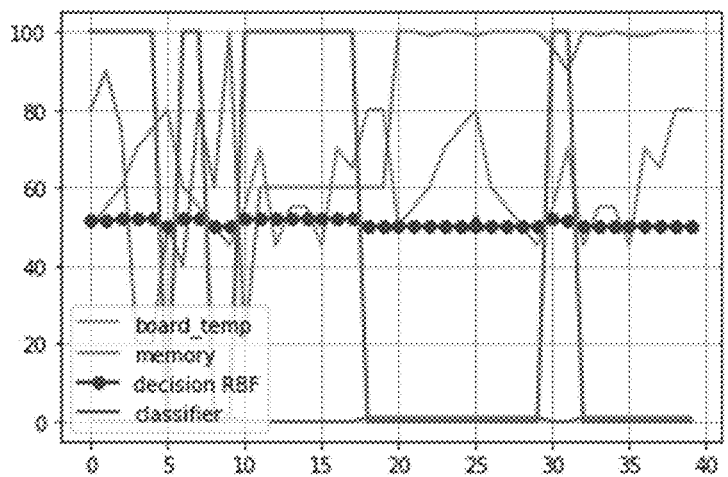
Figure 7C:
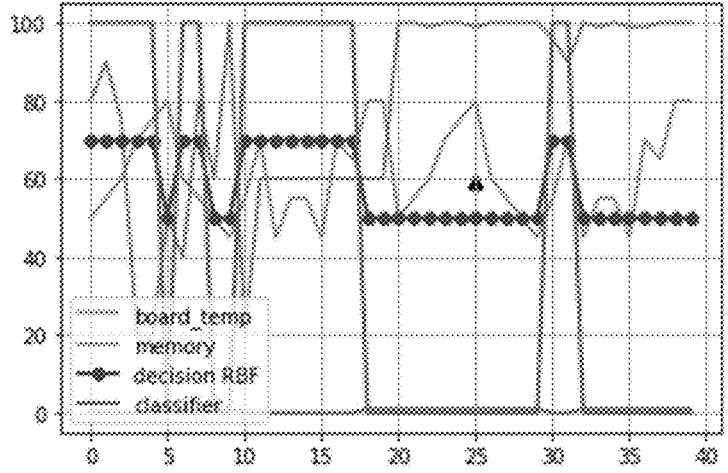

FIG. 7A, FIG. 7B, and FIG. 7C are prediction graphs illustrating different parameters applied to an SVM algorithm using a radial basis function (RBF) kernel. Each of FIG. 7A, FIG. 7B, and FIG. 7C include two features: board temperature (represented by orange line), and memory status (represented by green line) that are used by an SVM model to generate a status prediction (red line). The red line is interpreted so that it is classified as representing either "good" health or "bad" health (purple line).

FIG. 7A uses an RBF kernel with the following parameters:

```
Simulation 1:
svm_clf_RBF = Pipeline([
  ("scaler",StandardScaler( )),
  ("svm_clf",SVC(kernel="rbf",gamma=1,C=1))
])
```

FIG. 7B uses an RBF kernel with the following parameters:

```
Simulation 2 :
svm_clf_RBF = Pipeline([
  ("scaler",StandardScaler( )),
  ("svm_clf",SVC(kernel="rbf",gamma=1,C=0.5))
])
```

FIG. 7C uses an RBF kernel with the following parameters:

```
Simulation 3:
svm_clf_RBF = Pipeline([
  ("scaler",StandardScaler( )),
  ("svm_clf",SVC(kernel="rbf",gamma=1,C=5))
])
```

FIG. 8A, FIG. 8B, FIG. 8C, FIG. 8D, and FIG. 8E are prediction graphs illustrating different parameters applied to an SVM algorithm using a polynomial kernel. As in FIG. 7A to 7C, each of FIG. 8A to 8E include two features: board temperature (represented by orange line), and memory status (represented by green line) that are used by an SVM model to generate a status prediction (red line). The red line is interpreted so that it is classified as representing either "good" health or "bad" health (purple line).

Figure 8A:
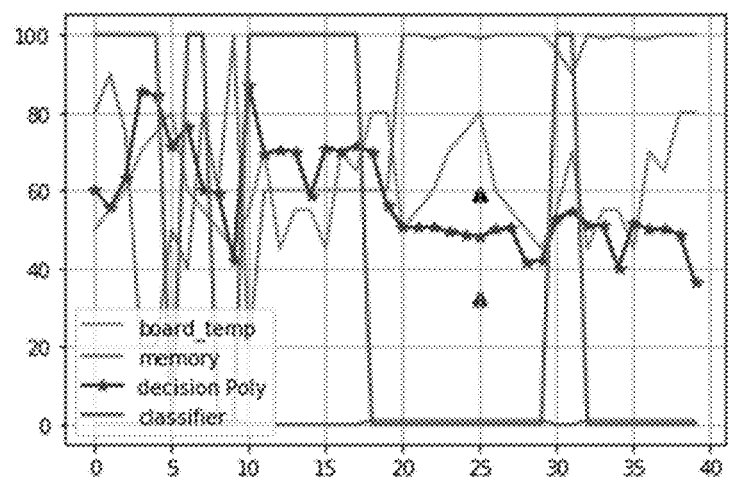
FIG. 8A, FIG. 8B, FIG. 8C, FIG. 8D, and FIG. 8E are prediction graphs illustrating different parameters applied to an SVM algorithm using a polynomial kernel, in accordance with one or more aspects of the present disclosure.

FIG. 8A uses a polynomial kernel with the following parameters:

```
Simulation 4:
svm_clf_poly = Pipeline([
  ("ploy_features",PolynomialFeatures(degree=2)),
  ("scaler",StandardScaler( )),
  ("linear_svm",LinearSVC(C=0.1,loss="hinge"))
```

Figure 8B:
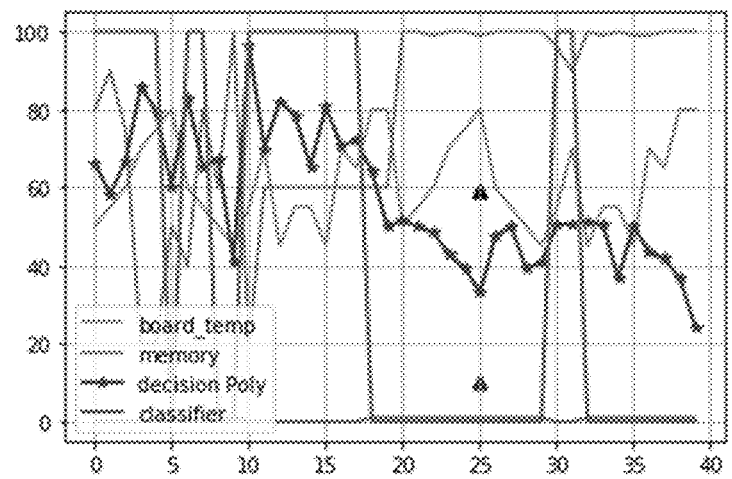

FIG. 8B uses a polynomial kernel with the following parameters:

```
Simulation 5:
svm_clf_poly = Pipeline([
  ("ploy_features",PolynomialFeatures(degree=2)),
  ("scaler",StandardScaler( )),
  ("linear_svm",LinearSVC(C=1,loss="hinge"))
])
```

Figure 8C:
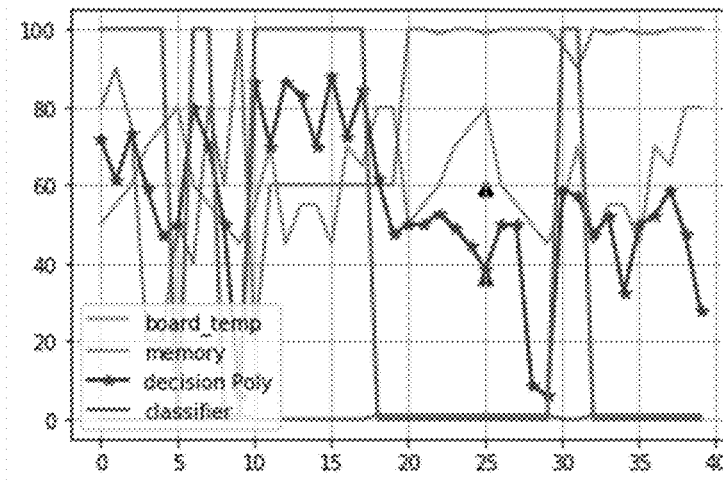

FIG. 8C uses a polynomial kernel with the following parameters:

```
Simulation 6:
svm_clf_poly = Pipeline([
  ("ploy_features",PolynomialFeatures(degree=2)),
  ("scaler",StandardScaler( )),
  ("linear_svm",LinearSVC(C=10,loss="hinge"))
])
```

Figure 8D:
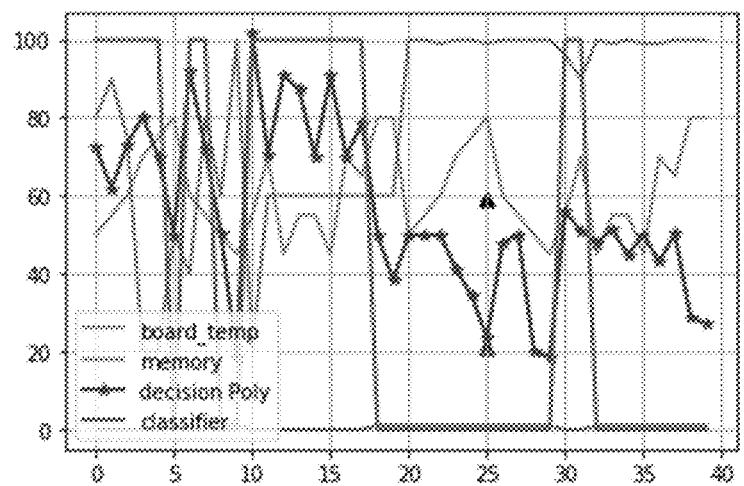

FIG. 8D uses a polynomial kernel with the following parameters:

```
Simulation 7:
svm_clf_poly = Pipeline([
  ("ploy_features",PolynomialFeatures(degree=3)),
  ("scaler",StandardScaler( )),
  ("linear_svm",LinearSVC(C=5,loss="hinge"))
])
```

Figure 8E:
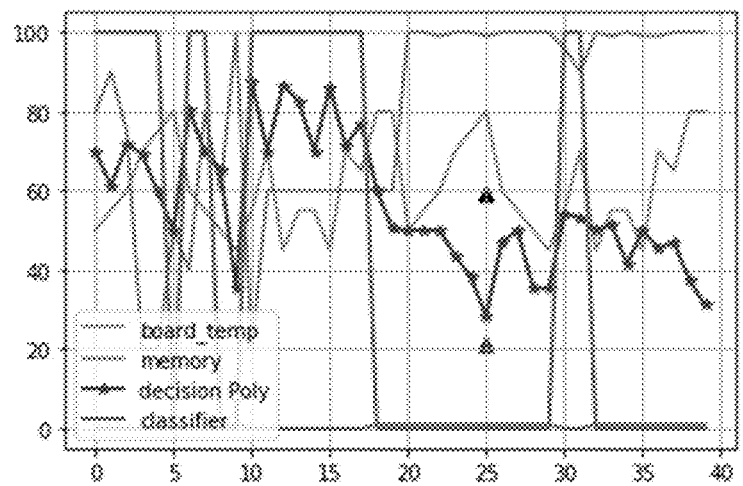

FIG. 8E uses a polynomial kernel with the following parameters:

```
Simulation 8:
svm_clf_poly = Pipeline([
    ("ploy_features",PolynomialFeatures(degree=3)),
    ("scaler",StandardScaler( )),
    ("linear_svm",LinearSVC(C=1,loss="hinge"))
```

Arriving at the correct parameters for an SVM model may involve both data collection and feature reduction to ensure that snapshot data collected is a correct and sufficiently comprehensive view of the router or routing engine control board at a given time. Identifying features to combine into a master feature is helpful to improve predictions, as is identifying which features can be ignored. In addition, finding redundancies and accommodating those redundancies into the system is helpful (e.g., if there is a BIOS fault, there is a benefit to making all other features redundant or effectively scaled down). Further, identifying features that tend to overpower classification algorithm is important so scaling can be performed for those features, and assign appropriate weights. Applying a soft versus hard margin is also an important consideration; a hard and narrow margin is often better, but a hard and/or narrow margin can be prone to overfitting.

In some examples, SVM tends to be the preferred classifier for a number of reasons. For example, an SVM classifier performs quite well when the number of data sets is less and number of features is more. Also, given that there are advantages to doing the training and re-training within the router (or even within the routing engine control boards), a classifier which is highly efficient and fast and SVM is helpful. In addition, there is wide availability of helpful C++ libraries for SVM. Some available libraries can be used as Linux processes within the router with significantly faster execution, and the SVM kernel can be customized as needed. SVM also has a convex optimization profile, so it tends to find a global maximum, local maxima tend to not be a concern, and convergence issues tend to be rare.

Linear Classifiers tend to provide poor predictions, so use of either an RBF kernel or a Polynomial kernel tends to be an improvement over a linear classifier. For a polynomial kernel, selecting the appropriate degree is important to avoid overfitting and to avoid slowing down the convergence.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., routers 150, routers 250, routing engines 270, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   performing, by a first routing engine included within a router, routing operations, wherein the router includes a plurality of routing engines, including the first routing engine and a second routing engine;
   collecting, by the router, training data that includes a plurality of sets of health indicators associated with routing engine health, each set having a status label indicating a corresponding health status for that set, wherein the plurality of sets of health indicators include information about power supply status, information about reset reasons, error status information, and temperature information;
   training, by the first routing engine and based on the training data, a machine learning model to determine a health status of the first routing engine;
   receiving, by the first routing engine, data including health indicators associated with the first routing engine, wherein the health indicators associated with the first routing engine include information about power supply status for the first routing engine, information about a reason for a prior reset of the first routing engine, error status information for the first routing engine, and temperature information associated with the first routing engine;
   applying, by the first routing engine, the machine learning model to the data to determine, from the health indicators, a predicted health status of the first routing engine;
   determining, by the first routing engine and based on the predicted health status of the first routing engine, whether to switch the routing operations to the second routing engine from the first routing engine;
   outputting, by the router, a user interface presenting information about the health indicators and information about the predicted health status of the first routing engine;
   receiving, by the router, information indicating that the predicted health status of the first routing engine is incorrect and
   retraining, by the router, the machine learning model based on the information indicating that the predicted health status of the first routing engine is incorrect.

2. The method of claim 1, wherein the data is a first set of data, the method further comprising:
   receiving, by the second routing engine, a second set of data including health indicators associated with the second routing engine; and
   applying, by the second routing engine, a support vector machines machine learning model to the second set of data to determine, from the health indicators associated with the second routing engine, a predicted health status of the second routing engine.

3. The method of claim 2, wherein determining whether to switch routing operations to the second routing engine includes:
  determining that the predicted health status of the first routing engine indicates bad health; and
  determining that the predicted health status of the second routing engine indicates good health.

4. The method of claim 3, further comprising:
  responsive to determining that the predicted health status of the first routing engine indicates bad health and determining that the predicted health status of the second routing engine indicates good health, automatically switching routing operations from the first routing engine to the second routing engine.

5. The method of claim 3, further comprising:
  outputting, by the router, an alert indicating that the predicted health status of the first routing engine is bad.

6. The method of claim 5, further comprising:
  responsive to receiving input from an administrator, switching routing operations to the second routing engine.

7. The method of claim 3, wherein the plurality of routing engines includes a third routing engine, and wherein determining whether to switch routing operations to the second routing engine includes:
  receiving, by the router, a third set of data including health indicators associated with the third routing engine; and
  applying, by the router, the support vector machines machine learning model to the third set of data to determine, from the health indicators associated with the third routing engine, a predicted health status of the third routing engine indicates bad health.

8. The method of claim 1, wherein training the machine learning model includes:
  training a support vector machines machine learning model to determine the predicted health status.

9. The method of claim 1, wherein the machine learning model is a support vector machines machine learning model.

10. The method of claim 1, wherein applying the machine learning model includes:
  preprocessing the data including health indicators associated with the first routing engine, wherein the preprocessing includes at least one of scaling, normalization, and applying default values to invalid data.

11. The method of claim 8, wherein the support vector machines machine learning model has a polynomial classifier of degree three.

12. The method of claim 1, wherein the health indicators further include at least one of:
  PRESENCE, Power_Control, Error_Status_Register, Interrupt_Status_Register, Temperature_Out_State, I2CS_Error_Status, DDR_Error, PCI_Endpoint_Missing, CPU_Temperature, Voltage_Temperature, Ethernet Stats, SSD Write threshold, Memory Usage rate, CPU Usage rate, and RCB_Board_Temperature.

13. A router comprising:
  a first routing engine including processing circuitry configured to perform routing operations as a primary routing engine; and
  a second routing engine configured to perform routing operations as a backup routing engine; and
  wherein the processing circuitry included within the first routing engine is further configured to:
    collect training data that includes a plurality of sets of health indicators associated with routing engine health, each set having a status label indicating a corresponding health status for that set, wherein the plurality of sets of health indicators include information about power supply status, information about reset reasons, error status information, and temperature information,
    train, based on the training data, a machine learning model to determine a health status of the first routing engine,
    receive data including health indicators associated with the first routing engine, wherein the health indicators associated with the first routing engine include information about power supply status for the first routing engine, information about a reason for a prior reset of the first routing engine, error status information for the first routing engine, and temperature information associated with the first routing engine,
    apply the machine learning model to the data to determine, from the health indicators, a predicted health status of the first routing engine,
    determine, based on the predicted health status of the first routing engine, whether to switch the routing operations to the second routing engine from the first routing engine;
    output a user interface presenting information about the health indicators and information about the predicted health status of the first routing engine;
    receive information indicating that the predicted health status of the first routing engine is incorrect; and
    retrain the machine learning model based on the information indicating that the predicted health status of the first routing engine is incorrect.

14. The router of claim 13, wherein the data is a first set of data, and wherein the second routing engine includes second routing engine processing circuitry configured to:
  receive a second set of data including health indicators associated with the second routing engine; and
  apply a support vector machines machine learning model to the second set of data to determine, from the health indicators associated with the second routing engine, a predicted health status of the second routing engine.

15. The router of claim 14, wherein to determine whether to switch routing operations to the second routing engine, the processing circuitry is further configured to:
  determine that the predicted health status of the first routing engine indicates bad health; and
  determine that the predicted health status of the second routing engine indicates good health.

16. The router of claim 15, wherein the processing circuitry is further configured to:
  responsive to determining that the predicted health status of the first routing engine indicates bad health and determining that the predicted health status of the second routing engine indicates good health, automatically switch routing operations from the first routing engine to the second routing engine.

17. The router of claim 15, wherein the processing circuitry is further configured to:
  output an alert indicating that the predicted health status of the first routing engine is bad; and
  responsive to receiving input from an administrator, switch routing operations to the second routing engine.

18. A non-transitory computer-readable storage medium comprising instructions that, when executed, configure processing circuitry of a router to:
  perform, by a first routing engine, routing operations, wherein the router includes a plurality of routing engines, including the first routing engine and a second routing engine;

collect training data that includes a plurality of sets of health indicators associated with routing engine health, each set having a status label indicating a corresponding health status for that set, wherein the plurality of sets of health indicators include information about power supply status, information about reset reasons, error status information, and temperature information;

train, by the first routing engine and based on the training data, a machine learning model to determine a health status of the first routing engine;

receive, by the first routing engine, data including health indicators associated with the first routing engine, wherein the health indicators associated with the first routing engine include information about power supply status for the first routing engine, information about a reason for a prior reset of the first routing engine, error status information for the first routing engine, and temperature information associated with the first routing engine;

apply, by the first routing engine, the machine learning model to the data to determine, from the health indicators, a predicted health status of the first routing engine;

determine, by the first routing engine and based on the predicted health status of the first routing engine, whether to switch the routing operations to the second routing engine from the first routing engine;

output a user interface presenting information about the health indicators and information about the predicted health status of the first routing engine;

receive information indicating that the predicted health status of the first routing engine is incorrect; and retrain the machine learning model based on the information indicating that the predicted health status of the first routing engine is incorrect.

* * * * *